United States Patent
Akimoto

(10) Patent No.: US 7,641,009 B2
(45) Date of Patent: Jan. 5, 2010

(54) POWER OUTPUT APPARATUS, VEHICLE EQUIPPED WITH POWER OUTPUT APPARATUS, AND CONTROL METHOD OF POWER OUTPUT APPARATUS

(75) Inventor: Hikokazu Akimoto, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 97 days.

(21) Appl. No.: 12/149,513

(22) Filed: May 2, 2008

(65) Prior Publication Data
US 2008/0277176 A1  Nov. 13, 2008

(30) Foreign Application Priority Data
May 9, 2007 (JP) .............................. 2007-124665

(51) Int. Cl.
*B60K 6/20* (2007.10)
(52) U.S. Cl. ............................. 180/65.21; 180/65.265; 180/65.275; 180/65.28
(58) Field of Classification Search ............. 180/65.21, 180/65.265, 65.275, 65.28
See application file for complete search history.

(56) References Cited

U.S. PATENT DOCUMENTS

| | | | |
|---|---|---|---|
| 6,522,024 B1 * | 2/2003 | Takaoka et al. | 290/40 C |
| 7,105,938 B2 * | 9/2006 | Edelson | 290/40 A |
| 7,237,634 B2 * | 7/2007 | Severinsky et al. | 180/65.23 |

| | | | |
|---|---|---|---|
| 2007/0204601 A1 * | 9/2007 | Ishii et al. | 60/295 |

FOREIGN PATENT DOCUMENTS

| | | |
|---|---|---|
| JP | 09-158961 A | 6/1997 |
| JP | 10-110636 A | 4/1998 |
| JP | 2000-110650 A | 4/2000 |
| JP | 2004-332714 A | 11/2004 |
| JP | 2006-063822 A | 3/2006 |
| JP | 2006-194215 A | 7/2006 |
| JP | 2006-336591 A | 12/2006 |

* cited by examiner

*Primary Examiner*—Glenn Dayoan
*Assistant Examiner*—Katy Meyer
(74) *Attorney, Agent, or Firm*—Kenyon & Kenyon LLP

(57) ABSTRACT

Upon incompletion of abnormality detection of an air-fuel ratio sensor provided in an exhaust pipe of an engine during operation of the engine (steps S310 and S320), when the state of charge SOC of a battery is lower than a preset reference charge level Sref or when the accelerator opening Acc is not less than a preset reference opening Aref (steps S330 and S340), the abnormality detection is not performed (step S350). When the state of charge SOC of the battery is not lower than the preset reference charge level Sref and when the accelerator opening Acc is less than the preset reference opening Aref (steps S330 and S340), the abnormality detection is performed to identify abnormality or normality of the air-fuel ratio sensor based on an air fuel ratio AF output from the air-fuel ratio sensor (steps S360 to S420). The drive control cuts off a fuel supply to the engine, controls a motor to enable motoring of the engine, and ensures output of a torque demand to a driveshaft, while the abnormality detection is performed.

4 Claims, 10 Drawing Sheets

POWER OUTPUT APPARATUS, VEHICLE EQUIPPED WITH POWER OUTPUT APPARATUS, AND CONTROL METHOD OF POWER OUTPUT APPARATUS

BACKGROUND OF THE INVENTION

1. Technical Field

The present invention relates to a power output apparatus, a vehicle equipped with the power output apparatus, and a control method of the power output apparatus.

2. Related Art

One proposed structure of a power output apparatus has an oxygen sensor provided in an exhaust pipe of an engine mounted on a vehicle (see, for example, Patent Document 1). The power output apparatus of this proposed structure uses the oxygen sensor to measure the concentration of oxygen included in an exhaust gas of the engine and performs feedback control based on the measured concentration of oxygen to regulate the amount of fuel injected into the engine.

Patent Document 1: Japanese Patent Laid-Open No. 2006-63822

SUMMARY OF THE INVENTION

The oxygen sensor is essential for the operation control of the engine. There is accordingly a requirement of abnormality detection to ensure non-occurrence of any abnormality in the oxygen sensor for the adequate operation control of the engine. The oxygen sensor detects the atmosphere introduced into the exhaust pipe in response to a cutoff of fuel supply to the engine in a rotating state of an output shaft of the engine. The result of such detection determines normality or abnormality of the oxygen sensor. In vehicles configured to allow an engine to stop its operation during a drive of the vehicle and to be driven with only the output power of a motor, however, there is a little opportunity of cutting off the fuel supply to the engine in the rotating state of the output shaft of the engine. In these vehicles, the abnormality detection of the oxygen sensor may not be performed at an appropriate frequency.

In the power output apparatus, the vehicle equipped with the power output apparatus, and the control method of the power output apparatus, there would thus be a demand for increasing the opportunity of abnormality detection and enabling adequate detection of any abnormality occurring in an oxygen sensor.

The present invention accomplishes at least part of the demands mentioned above and the other relevant demands by the following configurations applied to the power output apparatus, the vehicle equipped with the power output apparatus, and the control method of the power output apparatus.

According to one aspect, the invention pertains to a power output apparatus constructed to output power to a driveshaft. The power output apparatus includes:

an internal combustion engine;

an electric power-mechanical power input output assembly connected with the driveshaft and with an output shaft of the internal combustion engine in a rotatable manner independently of the driveshaft and configured to output a torque to the driveshaft and to the output shaft through input and output of electric power and mechanical power;

a motor designed to input and output power from and to the driveshaft;

an accumulator arranged to transmit electric power to and from the electric power-mechanical power input output assembly and the motor;

an oxygen content detector located in an exhaust system of the internal combustion engine and designed to measure a concentration of oxygen included in an exhaust gas of the internal combustion engine;

a charge level computation module configured to compute a charge level of the accumulator;

a driving force demand setting module configured to set a driving force demand required for the driveshaft; and a controller configured to, in response to an abnormality detection request for executing abnormality detection to identify abnormality or normality of the oxygen content detector during operation of the internal combustion engine, when the computed charge level of the accumulator is lower than a preset reference charge level, determine non-execution of the abnormality detection of the oxygen content detector regardless of the abnormality detection request, while controlling the internal combustion engine, the electric power-mechanical power input output assembly, and the motor to ensure output of a driving force corresponding to the set driving force demand to the driveshaft, and when the computed charge level of the accumulator is not lower than the preset reference charge level, to cut off a fuel supply to the internal combustion engine and execute the abnormality detection of identifying abnormality or normality of the oxygen content detector based on an output of the oxygen content detector, while controlling the internal combustion engine, the electric power-mechanical power input output assembly, and the motor to ensure output of a driving force corresponding to the set driving force demand to the driveshaft.

The power output apparatus according to one aspect of the invention computes the charge level of the accumulator and sets the driving force demand required for the driveshaft. In response to the abnormality detection request for executing abnormality detection to identify abnormality or normality of the oxygen content detector during operation of the internal combustion engine, when the computed charge level of the accumulator is lower than the preset reference charge level, the power output apparatus determines non-execution of the abnormality detection of the oxygen content detector regardless of the abnormality detection request, while controlling the internal combustion engine, the electric power-mechanical power input output assembly, and the motor to ensure output of a driving force corresponding to the set driving force demand to the driveshaft. When the computed charge level of the accumulator is not lower than the preset reference charge level, on the other hand, the power output apparatus cuts off the fuel supply to the internal combustion engine and executes the abnormality detection to identify abnormality or normality of the oxygen content detector based on the output of the oxygen content detector, while controlling the internal combustion engine, the electric power-mechanical power input output assembly, and the motor to ensure output of a driving force corresponding to the set driving force demand to the driveshaft. This arrangement desirably increases the opportunity of abnormality detection of the oxygen content detector and enables adequate detection of any abnormality occurring in the oxygen content detector, while ensuring output of the driving force demand to the driveshaft.

In one preferable application of the power output apparatus according to the invention, even at the computed charge level of the accumulator of not lower than the preset reference charge level, when the set driving force demand is not less than a preset reference driving force, the controller determines non-execution of the abnormality detection of the oxygen content detector while controlling the internal combustion engine, the electric power-mechanical power input output assembly, and the motor to ensure output of the driving force corresponding to the set driving force demand to the driveshaft. This arrangement ensures satisfaction of the driving force demand with the higher accuracy.

In one preferable embodiment of the power output apparatus according to the invention, the electric power-mechanical power input output assembly has:

a generator designed to input and output power; and a three shaft-type power input output structure connected to three shafts, the driveshaft, the output shaft of the internal combustion engine, and a rotating shaft of the generator, and designed to input and output power to a residual shaft based on powers input from and output to any two shafts among the three shafts.

Another aspect of the invention is directed to a vehicle including:

an internal combustion engine;

an electric power-mechanical power input output assembly connected to a driveshaft linked with an axle of the vehicle and to an output shaft of the internal combustion engine in a rotatable manner independently of the driveshaft and configured to output a torque to the driveshaft and to the output shaft through input and output of electric power and mechanical power;

a motor designed to input and output power from and to the driveshaft;

an accumulator arranged to transmit electric power to and from the electric power-mechanical power input output assembly and the motor;

an oxygen content detector located in an exhaust system of the internal combustion engine and designed to measure a concentration of oxygen included in an exhaust gas of the internal combustion engine;

a charge level computation module configured to compute a charge level of the accumulator;

a driving force demand setting module configured to set a driving force demand required for the driveshaft; and a controller configured to, in response to an abnormality detection request for executing abnormality detection to identify abnormality or normality of the oxygen content detector during operation of the internal combustion engine, when the computed charge level of the accumulator is lower than a preset reference charge level, determine non-execution of the abnormality detection of the oxygen content detector regardless of the abnormality detection request, while controlling the internal combustion engine, the electric power-mechanical power input output assembly, and the motor to ensure output of a driving force corresponding to the set driving force demand to the driveshaft, and when the computed charge level of the accumulator is not lower than the preset reference charge level, to cut off a fuel supply to the internal combustion engine and execute the abnormality detection of identifying abnormality or normality of the oxygen content detector based on an output of the oxygen content detector, while controlling the internal combustion engine, the electric power-mechanical power input output assembly, and the motor to ensure output of a driving force corresponding to the set driving force demand to the driveshaft.

The vehicle according to another aspect of the invention computes the charge level of the accumulator and sets the driving force demand required for the driveshaft. In response to the abnormality detection request for executing abnormality detection to identify abnormality or normality of the oxygen content detector during operation of the internal combustion engine, when the computed charge level of the accumulator is lower than a preset reference charge level, the vehicle determines non-execution of the abnormality detection of the oxygen content detector regardless of the abnormality detection request, while controlling the internal combustion engine, the electric power-mechanical power input output assembly, and the motor to ensure output of a driving force corresponding to the set driving force demand to the driveshaft. When the computed charge level of the accumulator is not lower than the preset reference charge level, on the other hand, the vehicle cuts off the fuel supply to the internal combustion engine and executes the abnormality detection to identify abnormality or normality of the oxygen content detector based on the output of the oxygen content detector, while controlling the internal combustion engine, the electric power-mechanical power input output assembly, and the motor to ensure output of a driving force corresponding to the set driving force demand to the driveshaft. This arrangement desirably increases the opportunity of abnormality detection of the oxygen content detector and enables adequate detection of any abnormality occurring in the oxygen content detector, while ensuring output of the driving force demand to the driveshaft.

In one preferable application of the vehicle according to the invention, even at the computed charge level of the accumulator of not lower than the preset reference charge level, when the set driving force demand is not less than a preset reference driving force, the controller determines non-execution of the abnormality detection of the oxygen content detector while controlling the internal combustion engine, the electric power-mechanical power input output assembly, and the motor to ensure output of the driving force corresponding to the set driving force demand to the driveshaft. This arrangement ensures satisfaction of the driving force demand with the higher accuracy.

Still another aspect of the invention is a control method of a power output apparatus. The power output apparatus has: an internal combustion engine; an electric power-mechanical power input output assembly connected with a driveshaft and with an output shaft of the internal combustion engine in a rotatable manner independently of the driveshaft and configured to output a torque to the driveshaft and to the output shaft through input and output of electric power and mechanical power; a motor designed to input and output power from and to the driveshaft; an accumulator arranged to transmit electric power to and from the electric power-mechanical power input output assembly and the motor; and an oxygen content detector located in an exhaust system of the internal combustion engine and designed to measure a concentration of oxygen included in an exhaust gas of the internal combustion engine. The control method computes a charge level of the accumulator; and sets a driving force demand required for the driveshaft. In response to an abnormality detection request for executing abnormality detection to identify abnormality or normality of the oxygen content detector during operation of the internal combustion engine, when the computed charge level of the accumulator is lower than a preset reference charge level, the control method determines non-execution of the abnormality detection of the oxygen content detector regardless of the abnormality detection request, while controlling the internal combustion engine, the electric power-mechanical power input output assembly, and the motor to ensure output of a driving force corresponding to the set driving force demand to the driveshaft. When the computed charge level of the accumulator is not lower than the preset reference charge level, the control method cuts off a fuel supply to the internal combustion engine and executes the abnormality detection to identify abnormality or normality of the oxygen content detector based on an output of the oxygen content detector, while controlling the internal combustion engine, the electric power-mechanical power input output assembly, and the motor to ensure output of a driving force corresponding to the set driving force demand to the driveshaft.

The control method of the power output apparatus according to still another aspect of the invention computes the charge level of the accumulator and sets the driving force demand required for the driveshaft. In response to the abnormality detection request for executing abnormality detection to identify abnormality or normality of the oxygen content detector during operation of the internal combustion engine, when the computed charge level of the accumulator is lower than a preset reference charge level, the control method determines non-execution of the abnormality detection of the oxygen content detector regardless of the abnormality detection request, while controlling the internal combustion engine, the electric power-mechanical power input output assembly, and the motor to ensure output of a driving force corresponding to the set driving force demand to the driveshaft. When the computed charge level of the accumulator is not lower than the preset reference charge level, on the other hand, the control method cuts off the fuel supply to the internal combustion engine and executes the abnormality detection to identify abnormality or normality of the oxygen content detector based on the output of the oxygen content detector, while controlling the internal combustion engine, the electric power-mechanical power input output assembly, and the motor to ensure output of a driving force corresponding to the set driving force demand to the driveshaft. This arrangement desirably increases the opportunity of abnormality detection of the oxygen content detector and enables adequate detection of any abnormality occurring in the oxygen content detector, while ensuring output of the driving force demand to the driveshaft.

In one preferable application according to this aspect of the invention, even at the computed charge level of the accumulator of not lower than the preset reference charge level, when the set driving force demand is not less than a preset reference driving force, the control method determines non-execution of the abnormality detection of the oxygen content detector while controlling the internal combustion engine, the electric power-mechanical power input output assembly, and the motor to ensure output of the driving force corresponding to the set driving force demand to the driveshaft.

BRIEF DESCRIPTION OF THE DRAWINGS

FIG. 10 shows variations in oxygen content against electric current from an air-fuel ratio sensor 135a representing an air fuel ratio AF and against voltage applied between electrodes of the air-fuel ratio sensor 135a;

DESCRIPTION OF THE PREFERRED EMBODIMENTS

Figure 1:
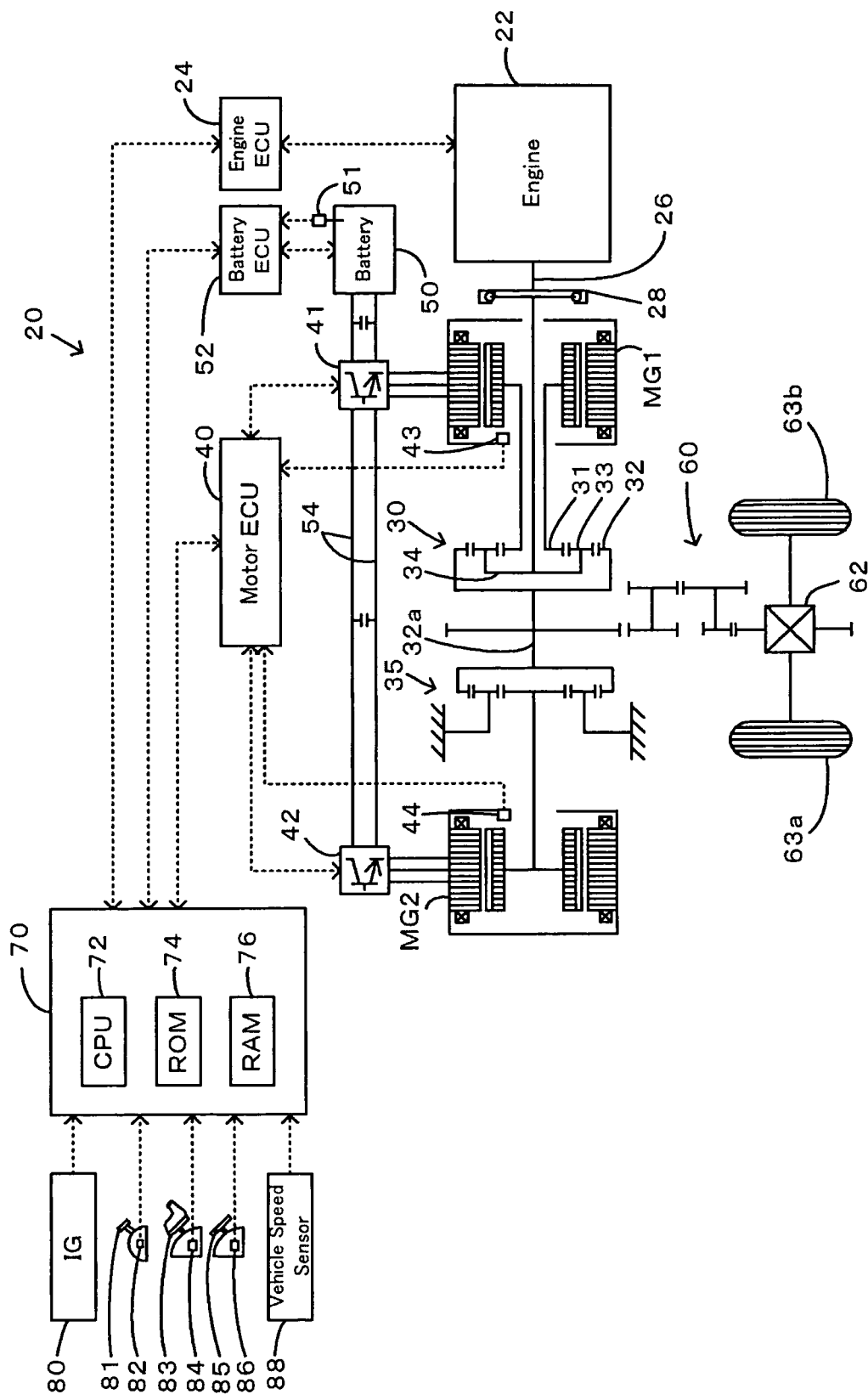
FIG. 1 schematically illustrates the configuration of a hybrid vehicle 20 equipped with a power output apparatus in one embodiment according to the invention.
Figure 2:
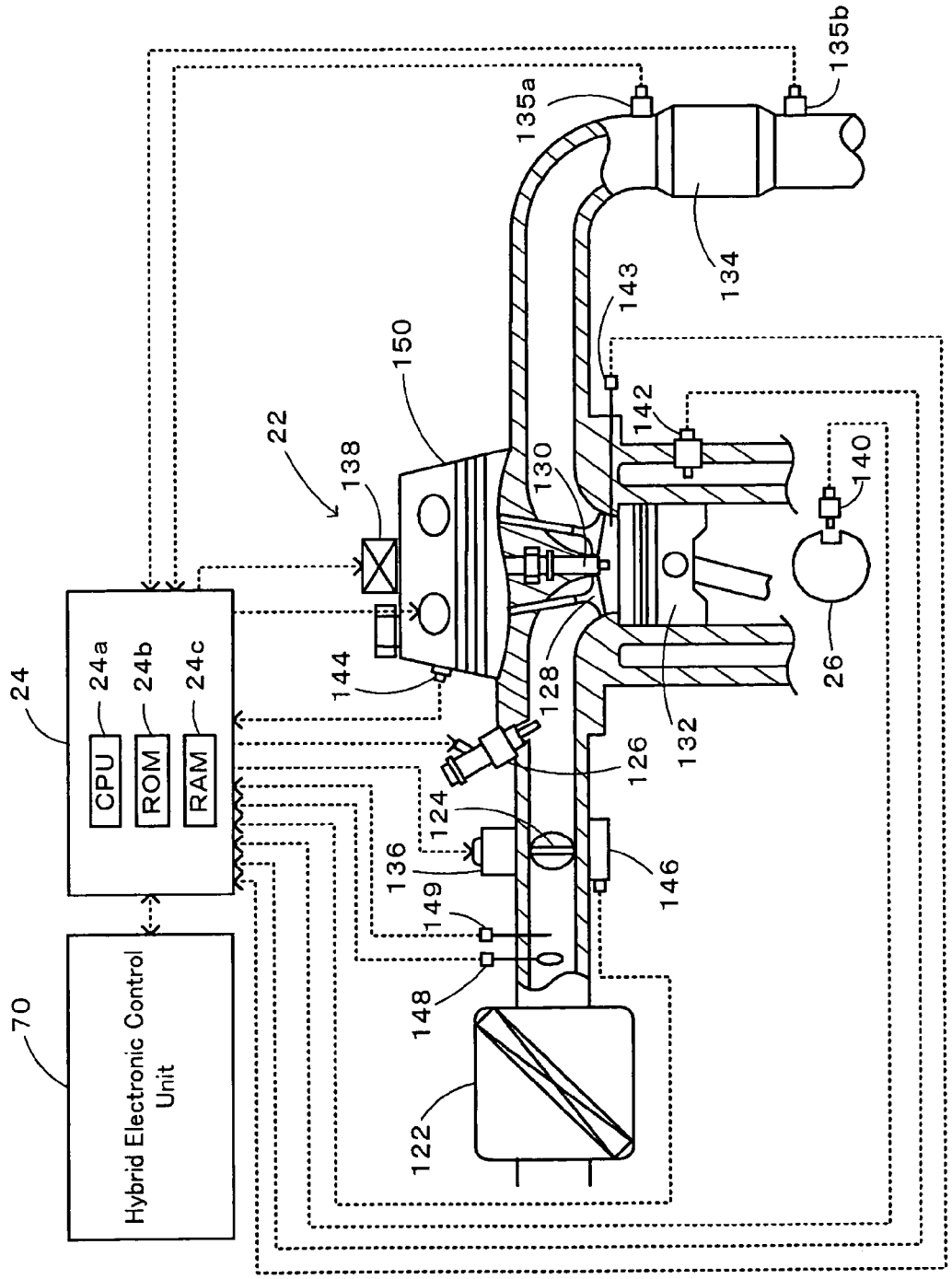
FIG. 2 is a schematic view showing the structure of an engine 22 mounted on the hybrid vehicle 20 of the embodiment.

FIG. 1 schematically illustrates the configuration of a hybrid vehicle 20 equipped with a power output apparatus in one embodiment according to the invention. FIG. 2 shows the schematic structure of an engine 22 mounted on the hybrid vehicle 20. As illustrated, the hybrid vehicle 20 of the embodiment includes the engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a reduction gear 35 attached to a ring gear shaft 32a or a driveshaft linked with the power distribution integration mechanism 30, a motor MG2 connected to the reduction gear 35, and a hybrid electronic control unit 70 configured to control the operations of the whole hybrid vehicle 20.

The engine 22 is an internal combustion engine that consumes a hydrocarbon fuel, such as gasoline or light oil, to output power. As shown in FIG. 2, the air cleaned by an air cleaner 122 and taken into an air intake conduit via a throttle valve 124 is mixed with the atomized fuel injected from a fuel injection valve 126 to the air-fuel mixture. The air-fuel mixture is introduced into a combustion chamber 166 by means of an intake valve 128. The introduced air-fuel mixture is ignited with spark made by a spark plug 130 to be explosively combusted. The reciprocating motions of a piston 132 pressed down by the combustion energy are converted into rotational motions of the crankshaft 26. The exhaust from the engine 22 goes through a catalytic converter (three-way catalyst) 134 to convert toxic components included in the exhaust, that is, carbon monoxide (CO), hydrocarbons (HC), and nitrogen oxides (NOx), into harmless components, and is discharged to the outside air.

The engine 22 is under control of an engine electronic control unit (hereafter referred to as engine ECU) 24. The engine ECU 24 is constructed as a microprocessor including a CPU 24a, a ROM 24b configured to store processing programs, a RAM 24c configured to temporarily store data, input and output ports (not shown), and a communication port (not shown). The engine ECU 24 receives, via its input port, signals from various sensors designed to measure and detect the operating conditions of the engine 22. The signals input into the engine ECU 24 include a crank position from a crank position sensor 140 detected as the rotational position of the crankshaft 26, a cooling water temperature from a water temperature sensor 142 measured as the temperature of cooling water in the engine 22, an in-cylinder pressure Pin from a pressure sensor 143 located inside the combustion chamber, cam positions from a cam position sensor 144 detected as the rotational positions of camshafts driven to open and close the intake valve 128 and an exhaust valve for gas intake and exhaust into and from the combustion chamber, a throttle position from a throttle valve position sensor 146 detected as the position of the throttle valve 124, an air flow meter signal from an air flow meter 148 located in an air intake conduit, an intake air temperature from a temperature sensor 149 located in the air intake conduit, an air fuel ratio AF from an air-fuel ratio sensor 135a located in an exhaust pipe in the upstream of a catalytic converter 134, and an oxygen signal from an oxygen sensor 135b located in the exhaust pipe in the downstream of the catalytic converter 134. The air-fuel ratio sensor 135a is constructed as a known limiting current sensor of measuring the electric current to determine the air-fuel ratio AF, although its structure is not specifically illustrated. In the air-fuel ratio sensor 135a, two electrodes are located on respective faces of a solid electrolyte such that one electrode is exposed to the exhaust gas and the other electrode is exposed to the atmosphere. A constant voltage is applied to the two electrodes. The quantity of oxygen ions moved through the solid electrolyte in response to application of the constant voltage corresponds to the amount of oxygen reaching the electrode exposed to the exhaust gas and is measured as electric current. The air-fuel ratio AF is computed from the measured electric current representing the quantity of the traveling oxygen ions. The engine ECU 24 outputs, via its output port, diverse control signals and driving signals to drive and control the engine 22. The signals output from the engine ECU 24 include driving signals to the fuel injection valve 126, driving signals to a throttle valve motor 136 driven to regulate the position of the throttle valve 124, control signals to an ignition coil 138 integrated with an igniter, and control signals to a variable valve timing mechanism 150 to vary the open and close timings of the intake valve 128. The engine ECU 24 establishes communication with the hybrid electronic control unit 70 to drive and control the engine 22 in response to control signals received from the hybrid electronic control unit 70 and to output data regarding the operating conditions of the engine 22 to the hybrid electronic control unit 70 according to the requirements. The engine ECU 24 also performs an arithmetic operation to compute a rotation speed of the crankshaft 26 or a rotation speed Ne of the engine 22 from the crank position input from the crank position sensor 140.

The power distribution integration mechanism 30 includes a sun gear 31 as an external gear, a ring gear 32 as an internal gear arranged concentrically with the sun gear 31, multiple pinion gears 33 arranged to engage with the sun gear 31 and with the ring gear 32, and a carrier 34 arranged to hold the multiple pinion gears 33 such as to allow both their revolutions and their rotations on their axes. The power distribution integration mechanism 30 is thus constructed as a planetary gear mechanism including the sun gear 31, the ring gear 32, and the carrier 34 as rotational elements of differential motions. The carrier 34, the sun gear 31, and the ring gear 32 of the power distribution integration mechanism 30 are respectively linked to the crankshaft 26 of the engine 22, to the motor MG1, and to the reduction gear 35 via the ring gear shaft 32a. When the motor MG1 functions as a generator, the power of the engine 22 input via the carrier 34 is distributed to the sun gear 31 and the ring gear 32 corresponding to their gear ratio. When the motor MG1 functions as a motor, on the other hand, the power of the engine 22 input via the carrier 34 is integrated with the power of the motor MG1 input via the sun gear 31 and is output to the ring gear 32. The power output to the ring gear 32 is transmitted from the ring gear shaft 32a through a gear mechanism 60 and a differential gear 62 and is eventually output to drive wheels 63a and 63b of the hybrid vehicle 20.

The motors MG1 and MG2 are constructed as known synchronous motor generators to enable operations as both a generator and a motor. The motors MG1 and MG2 transmit electric power to and from a battery 50 via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged upon the balance of the input and output of electric powers between the motors MG1 and MG2. Both the motors MG1 and MG2 are driven and controlled by a motor electronic control unit (hereafter referred to as motor ECU) 40. The motor ECU 40 inputs various signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 establishes communication with the hybrid electronic control unit 70 to drive and control the motors MG1 and MG2 in response to control signals received from the hybrid electronic control unit 70 and to output data regarding the operating conditions of the motors MG1 and MG2 to the hybrid electronic control unit 70 according to the requirements. The motor ECU 40 also performs arithmetic operations to compute rotation speeds Nm1 and Nm2 of the motors MG1 and MG2 from the output signals of the rotational position detection sensors 43 and 44.

Figure 3:
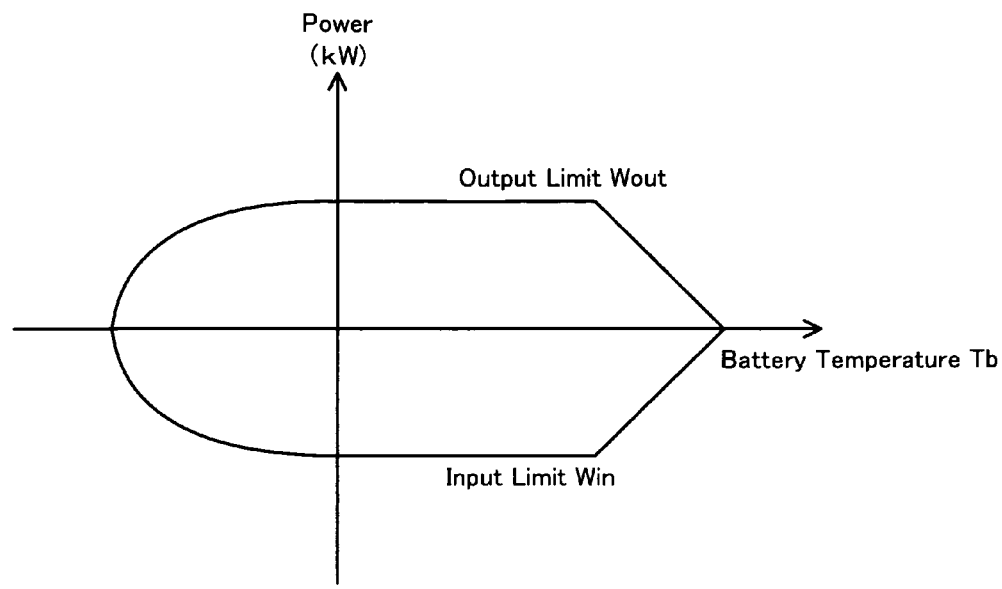
FIG. 3 shows variations of an input limit Win and an output limit Wout against battery temperature Tb of a battery 50.
Figure 4:
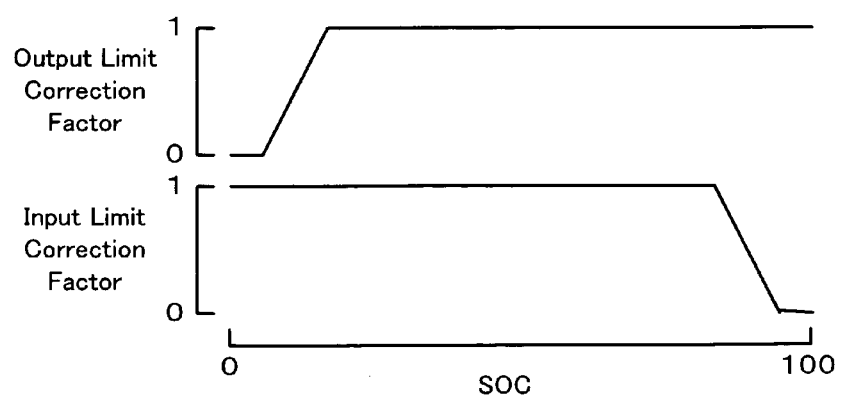
FIG. 4 shows variations of an input limit correction factor and an output limit correction factor against state of charge SOC of the battery 50.

The battery 50 is under control and management of a battery electronic control unit (hereafter referred to as battery ECU) 52. The battery ECU 52 inputs signals required for management and control of the battery 50, for example, an inter-terminal voltage from a voltage sensor (not shown) located between terminals of the battery 50, a charge-discharge current from a current sensor (not shown) located in the power line 54 connecting with an output terminal of the battery 50, and a battery temperature Tb from a temperature sensor 51 attached to the battery 50. The battery ECU 52 outputs data regarding the operating conditions of the battery 50 by communication to the hybrid electronic control unit 70 according to the requirements. The battery ECU 52 also performs various arithmetic operations for management and control of the battery 50. A remaining charge or state of charge SOC of the battery 50 is calculated from an integrated value of the charge-discharge current measured by the current sensor. An input limit Win as an allowable charging electric power to be charged in the battery 50 and an output limit Wout as an allowable discharging electric power to be discharged from the battery 50 are set corresponding to the calculated state of charge SOC and the battery temperature Tb. A concrete procedure of setting the input and output limits Win and Wout of the battery 50 sets base values of the input limit Win and the output limit Wout corresponding to the battery temperature Tb, specifies an input limit correction factor and an output limit correction factor corresponding to the state of charge SOC of the battery 50, and multiplies the base values of the input limit Win and the output limit Wout by the specified input limit correction factor and output limit correction factor to determine the input limit Win and the output limit Wout of the battery 50. FIG. 3 shows variations of the input limit Win and the output limit Wout against the battery temperature Tb of the battery 50. FIG. 4 shows variations of the input limit correction factor and the output limit correction factor against the state of charge SOC of the battery 50.

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, a vehicle speed V from a vehicle speed sensor 88. The hybrid electronic control unit 70 establishes communication with the engine ECU 24, the motor ECU 40, and the battery ECU 52 90 via its communication port to receive and send the diversity of control signals and data from and to the engine ECU 24, the motor ECU 40, and the battery ECU 52 as mentioned above.

The hybrid vehicle 20 of the embodiment constructed as described above sets a torque demand Tr*, which is to be output to the ring gear shaft 32a or the driveshaft, based on the vehicle speed V and the accelerator opening Acc corresponding to the driver's depression amount of the accelerator pedal 83, and controls the operations of the engine 22 and the motors MG1 and MG2 to ensure output of a power demand equivalent to the preset torque demand Tr* to the ring gear shaft 32a. There are several drive control modes of the engine 22 and the motors MG1 and MG2. In a torque conversion drive mode, while the engine 22 is driven and controlled to ensure output of a power equivalent to the power demand, the motors MG1 and MG2 are driven and controlled to enable all the output power of the engine 22 to be subjected to torque conversion by the power distribution integration mechanism 30 and the motors MG1 and MG2 and to be output to the ring gear shaft 32a. In a charge-discharge drive mode, the engine 22 is driven and controlled to ensure output of a power corresponding to the sum of the power demand and an electric power required for charging the battery 50 or an electric power to be discharged from the battery 50. The motors MG1 and MG2 are driven and controlled to enable all or part of the output power of the engine 22 with charge or discharge of the battery 50 to be subjected to torque conversion by the power distribution integration mechanism 30 and the motors MG1 and MG2 and to ensure output of a power equivalent to the power demand to the ring gear shaft 32a. In a motor drive mode, the motor MG2 is driven and controlled to ensure output of a power equivalent to the power demand to the ring gear shaft 32a, while the engine 22 stops its operation. In a fuel cutoff drive mode, the fuel supply to the engine 22 is cut off, and the engine 22 is motored to keep its rotation by means of the motor MG1. The motor MG2 is driven and controlled to ensure output of a power equivalent to the power demand to the ring gear shaft 32a.

As the control operations of the engine 22, the variable valve timing mechanism 150 is controlled to have the open and close timings of the intake valve 128 corresponding to the accelerator opening Acc and the torque demand Tr*, while the throttle valve 124 is controlled to have a throttle opening corresponding to a target torque Te* to be output from the engine 22. The fuel injection valve 126 is controlled to inject a corrected amount of fuel at an adequate timing. The corrected amount of fuel is determined by making diverse corrections on a specific amount of fuel injection set relative to the amount of intake air to attain the stoichiometric air fuel ratio. The corrections include a correction by feedback control based on the air fuel ratio from the air-fuel ratio sensor 135a and the oxygen content from the oxygen sensor 135b. The ignition coil 138 is then controlled to ignite the air-fuel ratio introduced into the combustion chamber at an adequate timing by the spark plug 130.

Figure 5:
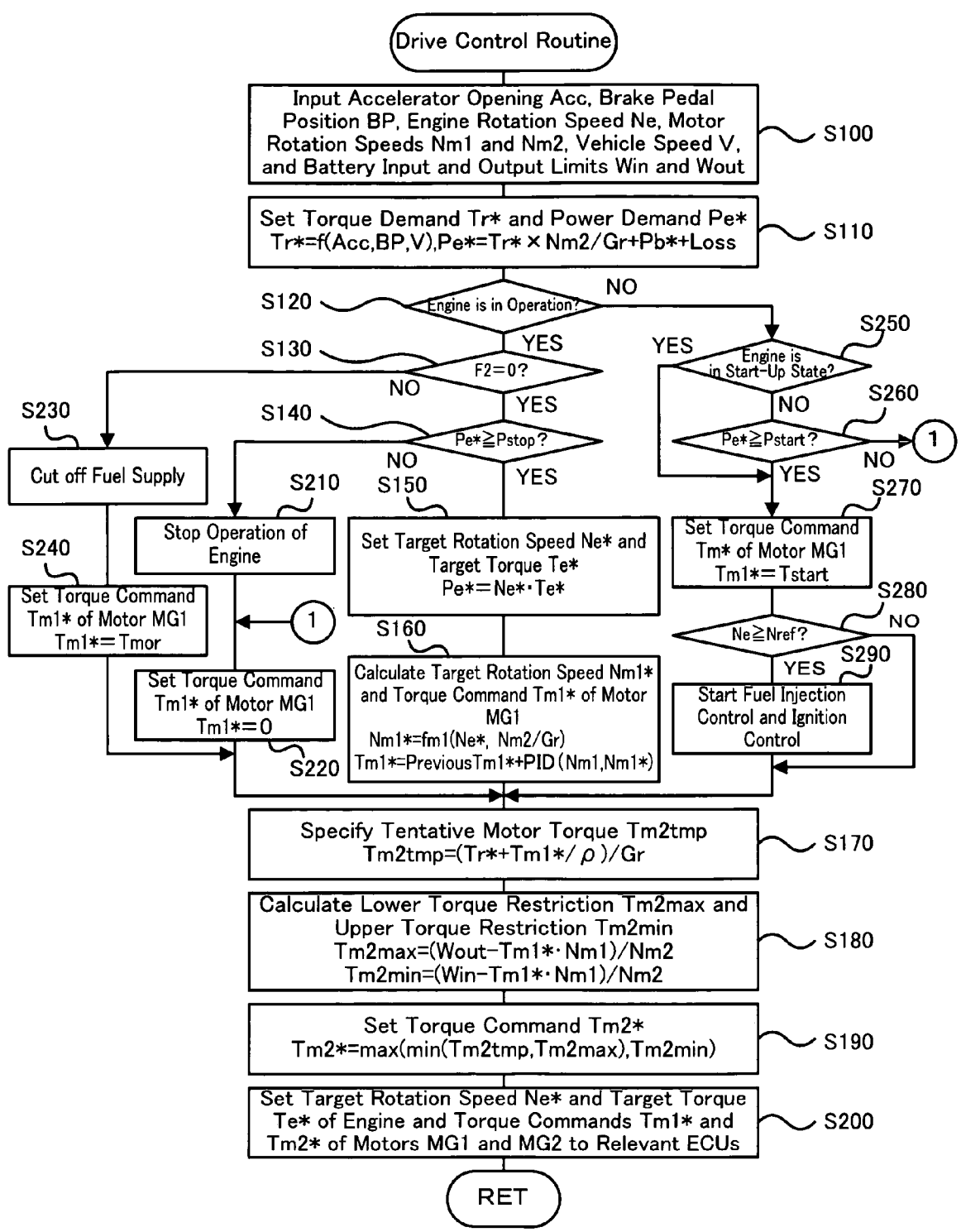
FIG. 5 is a flowchart showing a drive control routine executed by a hybrid electronic control unit 70 included in the hybrid vehicle 20 of the embodiment.

The following describes the operations of the hybrid vehicle 20 of the embodiment having the configuration discussed above, especially a series of operation control to detect an abnormality or deterioration of the air-fuel ratio sensor 135a. As a matter of convenience, the description sequentially regards general drive control of the hybrid vehicle 20 and abnormality detection for detecting an abnormality of the air-fuel ratio sensor 135a. FIG. 5 is a flowchart showing a drive control routine executed by the hybrid electronic control unit 70. This drive control routine is performed repeatedly at preset time intervals, for example, at every several msec.

On the start of the drive control routine of FIG. 5, the CPU 72 of the hybrid electronic control unit 70 first inputs various data required for control, for example, the accelerator opening Acc from the accelerator pedal position sensor 84, the brake pedal position BP from the brake pedal position sensor 86, the vehicle speed V from the vehicle speed sensor 88, rotation speeds Nm1 and Nm2 of the motors MG1 and MG2, the rotation speed Ne of the engine 22, and the input limit Win and the output limit Wout of the battery 50 (step S100). The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The rotation speed Ne of the engine 22 is computed from the crank position detected by the crank position sensor 140 and is received from the engine ECU 24 by communication. The input limit Win and the output limit Wout of the battery 50 are set by the battery ECU 52 and are received from the battery ECU 52 by communication.

Figure 6:
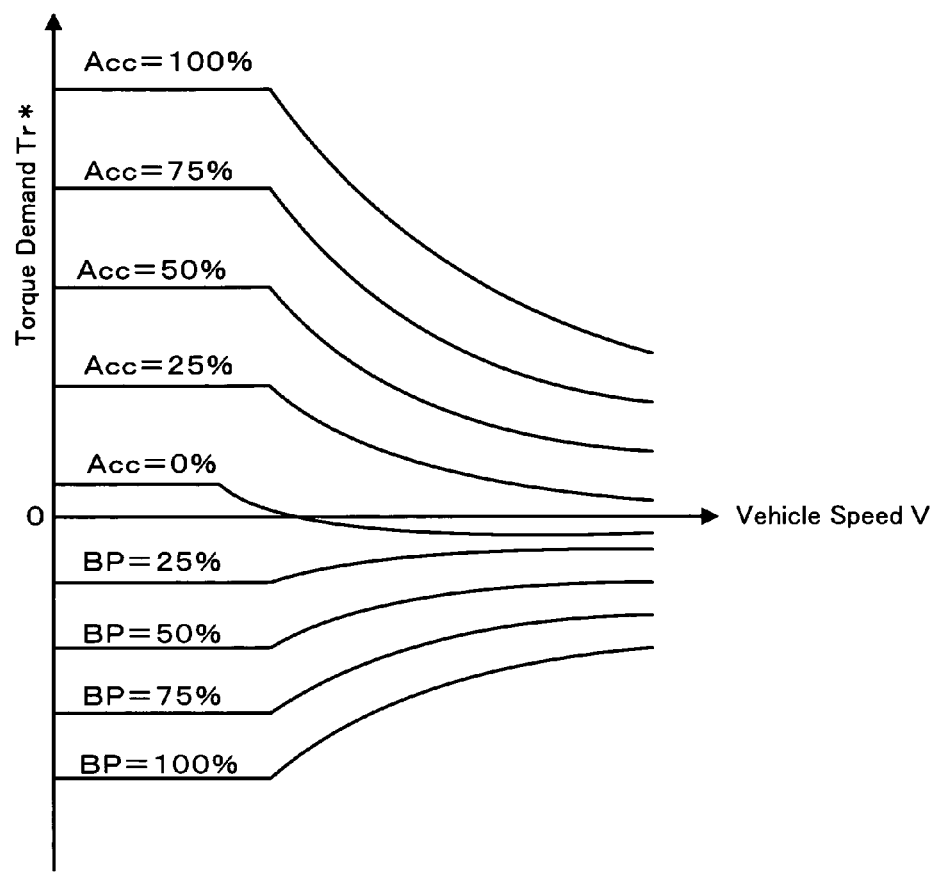
FIG. 6 shows one example of a torque demand setting map.

After the data input, the CPU 72 sets a torque demand Tr* to be output to the ring gear shaft 32a or the driveshaft linked with the drive wheels 63a and 63b as a torque required for the hybrid vehicle 20 and a power demand Pe* to be output from the engine 22, based on the input accelerator opening Acc, the input brake pedal position BP, and the input vehicle speed V (step S110). A concrete procedure of setting the torque demand Tr* in this embodiment stores in advance variations in torque demand Tr* against the vehicle speed V with regard to various settings of the accelerator opening Acc or the brake pedal position BP as a torque demand setting map in the ROM 74 and reads the torque demand Tr* corresponding to the given accelerator opening Acc or the given brake pedal position BP and the given vehicle speed V from this torque demand setting map. One example of the torque demand setting map is shown in FIG. 6. The power demand Pe* is calculated as the sum of the product of the set torque demand Tr* and a rotation speed Nr of the ring gear shaft 32a, a charge-discharge power demand Pb* to be charged into or discharged from the battery 50, and a potential loss. The rotation speed Nr of the ring gear shaft 32a is obtained by multiplying the vehicle speed V by a preset conversion factor k or by dividing the rotation speed Nm2 of the motor MG2 by a gear ratio Gr of the reduction gear 35.

It is then determined whether the engine 22 is in operation or is at stop (step S120). When it is determined at step S120 that the engine 22 is in operation, the CPU 72 identifies the value of an abnormality detection execution flag F2 representing execution or non-execution of an abnormality detection process to detect the occurrence or non-occurrence of an abnormality of the air-fuel ratio sensor 135a (step S130). Upon identification of the abnormality detection execution flag F2 equal to 0 representing non-execution of abnormality detection of the air-fuel ratio sensor 135a at step S130, the power demand Pe* obtained at step S110 is compared with a preset reference value Pstop used as a criterion for stopping the operation of the engine 22 (step S140). The reference value Pstop is set close to a lower limit value in a power range of ensuring relatively efficient operation of the engine 22.

Figure 7:
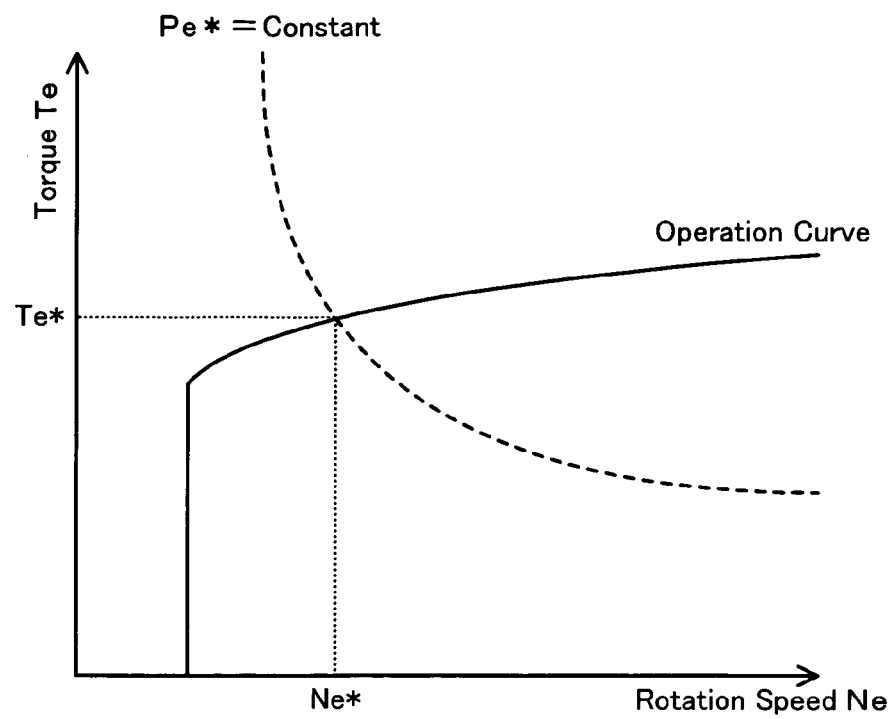
FIG. 7 shows an operation curve of the engine used to set a target rotation speed Ne* and a target torque Te* of the engine 22.

When the power demand Pe* is not less than the preset reference value Pstop (step S140: yes), there is a requirement for keeping the operation of the engine 22. A target rotation speed Ne* and a target torque Te* defining a target drive point of the engine 22 are set, based on the power demand Pe* of the engine 22 (step S150). In this embodiment, the target rotation speed Ne* and the target torque Te* are determined according to an operation curve of ensuring efficient operation of the engine 22 and a curve of the power demand Pe*. FIG. 7 shows an operation curve of the engine 22 used to set the target rotation speed Ne* and the target torque Te*. As clearly shown in FIG. 7, the target rotation speed Ne* and the target torque Te* are given as an intersection of the operation curve and a curve of constant power demand Pe* (=Ne*×Te*).

The CPU 72 subsequently calculates a target rotation speed Nm1* of the motor MG1 from the target rotation speed Ne* of the engine 22, the rotation speed Nm2 of the motor MG2, and a gear ratio ρ of the power distribution integration mechanism 30 according to Equation (1) given below, while calculating a torque command Tm1* as a torque to be output from the motor MG1 from the calculated target rotation speed Nm1* and the input rotation speed Nm1 of the motor MG1 according to Equation (2) given below (step S160):

$$Nm1^* = Ne^* \cdot (1+\rho)/\rho - Nm2/Gr \quad (1)$$

$$Tm1^* = \rho \cdot Te^*/(1+\rho) + k1(Nm1^* - Nm1) + k2\int(Nm1^* - Nm1)dt \quad (2)$$

Figure 8:
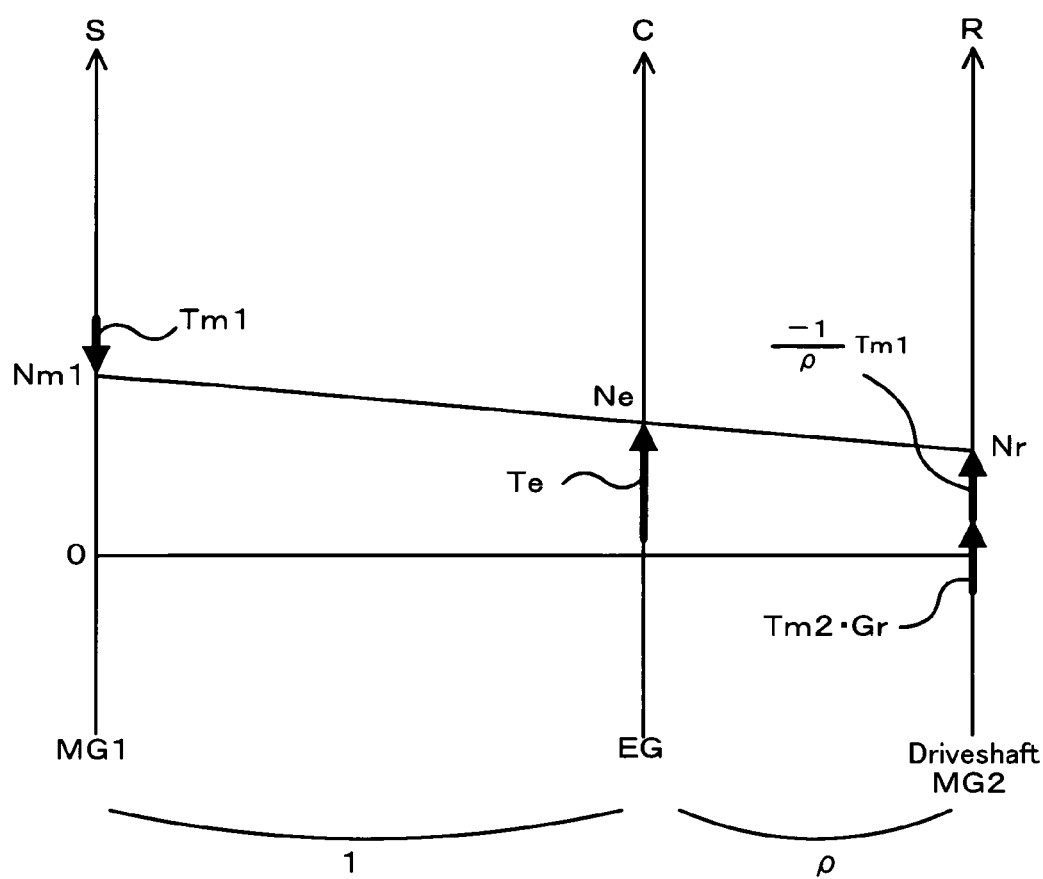
FIG. 8 is an alignment chart showing torque-rotation speed dynamics of respective rotational elements included in a power distribution integration mechanism 30 during drive of the hybrid vehicle 20 with output power of the engine 22.

Equation (1) is a dynamic relational expression of respective rotational elements included in the power distribution integration mechanism 30. FIG. 8 is an alignment chart showing torque-rotation speed dynamics of the respective rotational elements included in the power distribution integration mechanism 30 during drive of the hybrid vehicle 20 with output power of the engine 22. The left axis 'S' represents a rotation speed of the sun gear 31 that is equivalent to the rotation speed Nm1 of the motor MG1. The middle axis 'C' represents a rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35. Equation (1) is readily introduced from this alignment chart. Two thick arrows on the axis 'R' respectively show a torque applied to the ring gear shaft 32a by output of the torque Tm1 from the motor MG1, and a torque applied to the ring gear shaft 32a via the reduction gear 35 by output of the torque Tm2 from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

The CPU 72 then adds the result of division of the torque command Tm1* by the gear ratio ρ of the power distribution integration mechanism 30 to the torque demand Tr* and specifies a tentative torque Tm2tmp as a provisional value of torque to be output from the motor MG2 according to Equation (3) given below (step S170):

$$Tm2tmp = (Tr^* + Tm1^*/\rho)/Gr \quad (3)$$

The CPU 72 subsequently calculates a lower torque restriction Tm2min and an upper torque restriction Tm2max as allowable minimum and maximum torques output from the motor MG2 according to Equations (4) and (5) given below (step S180):

$$Tm2\min = (Win - Tm1^* \cdot Nm1)/Nm2 \quad (4)$$

$$Tm2\max = (Wout - Tm1^* \cdot Nm1)/Nm2 \quad (5)$$

The lower torque restriction Tm2min and the upper torque restriction Tm2max are obtained by dividing respective differences between the input limit Win or the output limit Wout of the battery 50 and power consumption (power generation) of the motor MG1, which is the product of the calculated torque command Tm1* and the current rotation speed Nm1 of the motor MG1, by the current rotation speed Nm2 of the motor MG2. The CPU 72 then limits the specified tentative torque Tm2tmp by the calculated lower torque restriction Tm2min and upper torque restriction Tm2max according to Equation (6) given below to set a torque command Tm2* of the motor MG2 (step S190):

$$Tm2^* = \max(\min(Tm2tmp, Tm2\max), Tm2\min) \quad (6)$$

Equation (3) given above is readily introduced from the alignment chart of FIG. 8.

After setting the target rotation speed Ne* and the target torque Te* of the engine 22 and the torque commands Tm1* and Tm2* of the motors MG1 and MG2, the CPU 72 sends the target rotation speed Ne* and the target torque Te* of the engine 22 to the engine ECU 24 and the torque commands Tm1* and Tm2* of the motors MG1 and MG2 to the motor ECU 40 (step S200) and exits from the drive control routine of FIG. 5. The engine ECU 24 receives the settings of the target rotation speed Ne* and the target torque Te* and performs required controls of the engine 22, such as fuel injection control and ignition control, to drive the engine 22 at a target drive point defined by the combination of the target rotation speed Ne* and the target torque Te*. The motor ECU 40 receives the settings of the torque commands Tm1* and Tm2* and performs switching control of switching elements included in the respective inverters 41 and 42 to drive the motor MG1 with the torque command Tm1* and the motor MG2 with the torque command Tm2*. Such control enables the torque demand Tr* within the range of the input limit Win or the output limit Wout of the battery 50 to be output to the ring gear shaft 32a or the driveshaft for driving the hybrid vehicle 20.

When the power demand Pe* is less than the preset reference value Pstop (step S140: no), on the other hand, there is a requirement for stopping the operation of the engine 22. The CPU 72 then sends a control signal to the engine ECU 24 to interrupt the fuel injection control and the ignition control and accordingly stop the operation of the engine 22 (step S210) and sets 0 to the torque command Tm1* of the motor MG1 (step S220). Substitution of the torque command Tm1* set equal to 0 into Equation (3) given above specifies the tentative torque Tm2tmp as the provisional value of torque to be output from the motor MG2 (step S170). Substitution of the torque command Tm1* set equal to 0 into Equations (4) and (5) given above determine the lower torque restriction Tm2min and the upper torque restriction Tm2max of the motor MG2 (step S180). The torque command Tm2* of the motor MG2 is subsequently set by limiting the tentative torque Tm2tmp with the lower torque restriction Tm2min and the upper torque restriction Tm2max according to Equation (6) given above (step S190). The CPU 72 sends the settings of the torque commands Tm1* and Tm2* of the motors MG1 and MG2 to the motor ECU 40 (step S200) and exits from the drive control routine of FIG. 5. Such control stops the operation of the engine 22, while enabling the hybrid vehicle 20 to be driven with output of the torque demand Tr* from the motor MG2 to the ring gear shaft 32a or the driveshaft within the range of the input limit Win or the output limit Wout of the battery 50.

Upon identification of the abnormality detection flag F2 equal to 1 representing execution of abnormality detection of the air-fuel ratio sensor 135a at step S130, on the other hand, the CPU 72 sends a fuel supply cutoff instruction to the engine ECU 24 to cut off the fuel supply into the engine 22, as the required control for the abnormality detection (step S230). The torque command Tm1* of the motor MG1 is then set to a motoring torque Tmor as a torque required for motoring the engine 22 in order to keep the rotation of the crankshaft 26 of the engine 22 in the fuel cutoff state (step S240). The tentative torque Tm2tmp is then specified according to Equation (3) given above as the provisional value of torque to be output from the motor MG2 (step S170). The lower torque restriction Tm2min and the upper torque restriction Tm2max of the motor MG2 are calculated according to Equations (4) and (5) given above (step S180). The torque command Tm2* of the motor MG2 is subsequently set by limiting the tentative torque Tm2tmp with the lower torque restriction Tm2min and the upper torque restriction Tm2max according to Equation (6) given above (step S190). The CPU 72 sends the settings of the torque commands Tm1* and Tm2* of the motors MG1 and MG2 to the motor ECU 40 (step S200) and exits from the drive control routine of FIG. 5. Such control keeps the rotation of the crankshaft 26 in the fuel cutoff state of the engine 22, while enabling the hybrid vehicle 20 to be driven with output of the torque demand Tr* from the motor MG2 to the ring gear shaft 32a or the driveshaft within the range of the input limit Win or the output limit Wout of the battery 50.

When it is determined at step S120 that the engine 22 is not in operation but is at stop, the CPU 72 sequentially determines whether the engine 22 is in a start-up state (step S250) and whether the power demand Pe* is not less than a preset reference value Pstart used as a criterion for starting the engine 22 (step S260). The reference value Pstart may be set close to the lower limit value of the power range of ensuring relatively efficient operation of the engine 22. In order to prevent frequent stops and starts of the engine 22, the reference value Pstart is preferably greater than the reference value Pstop used as the criterion for stopping the operation of the engine 22. Under the conditions that the engine 22 is at stop (step S120) and is not in the start-up state (step S250) and that the power demand Pe* is less than the preset reference value Pstart (step S260), it is determined to keep the operation stop state of the engine 22. The processing of steps S220 and S170 to S200 is then executed as described above.

Under the conditions that the engine 22 is at stop (step S120) and is not in the start-up state (step S250) and that the power demand Pe* is not less than the preset reference value Pstart (step S260), it is determined to start up the engine 22. A starting torque Tstart as a torque required for motoring the engine 22 at a start-up is set to the torque command Tm1* of the motor MG1 (step S270). The CPU 72 then determines whether the rotation speed Ne of the engine 22 reaches or exceeds a preset reference rotation speed Nref for starting fuel injection control and ignition control (step S280). In the initial stage of the start-up operation of the engine 22, the rotation speed Ne of the engine is still low and does not reach the rotation speed Nref. A negative answer is then given at step S280 and does not start the fuel injection control or the ignition control. The tentative torque Tm2tmp is then specified according to Equation (3) given above as the provisional value of torque to be output from the motor MG2 (step S170). The lower torque restriction Tm2min and the upper torque restriction Tm2max of the motor MG2 are calculated according to Equations (4) and (5) given above (step S180). The torque command Tm2* of the motor MG2 is subsequently set by limiting the tentative torque Tm2tmp with the lower torque restriction Tm2min and the upper torque restriction Tm2max according to Equation (6) given above (step S190). The CPU 72 sends the settings of the torque commands Tm1* and Tm2* of the motors MG1 and MG2 to the motor ECU 40 (step S200) and exits from the drive control routine of FIG. 5. At the start of the start-up operation of the engine 22, it is determined at step S250 that the engine 22 is in the start-up state. The CPU 72 then sets the starting torque Tstart to the torque command Tm1* of the motor MG1 (step S270) and waits until the increase of the rotation speed Ne of the engine 22 to or over the preset reference rotation speed Nref for starting the fuel injection control and the ignition control (step S280). In response to the increase of the rotation speed Ne of the engine 22 to or over the preset reference rotation speed Nref, the CPU 72 sends a control signal to the engine ECU 24 to start the fuel injection control and the ignition control (step S290). Such control starts up the engine 22, while enabling the hybrid vehicle 20 to be driven with output of the torque demand Tr* from the motor MG2 to the ring gear shaft 32a or the driveshaft within the range of the input limit Win or the output limit Wout of the battery 50.

Figure 9:
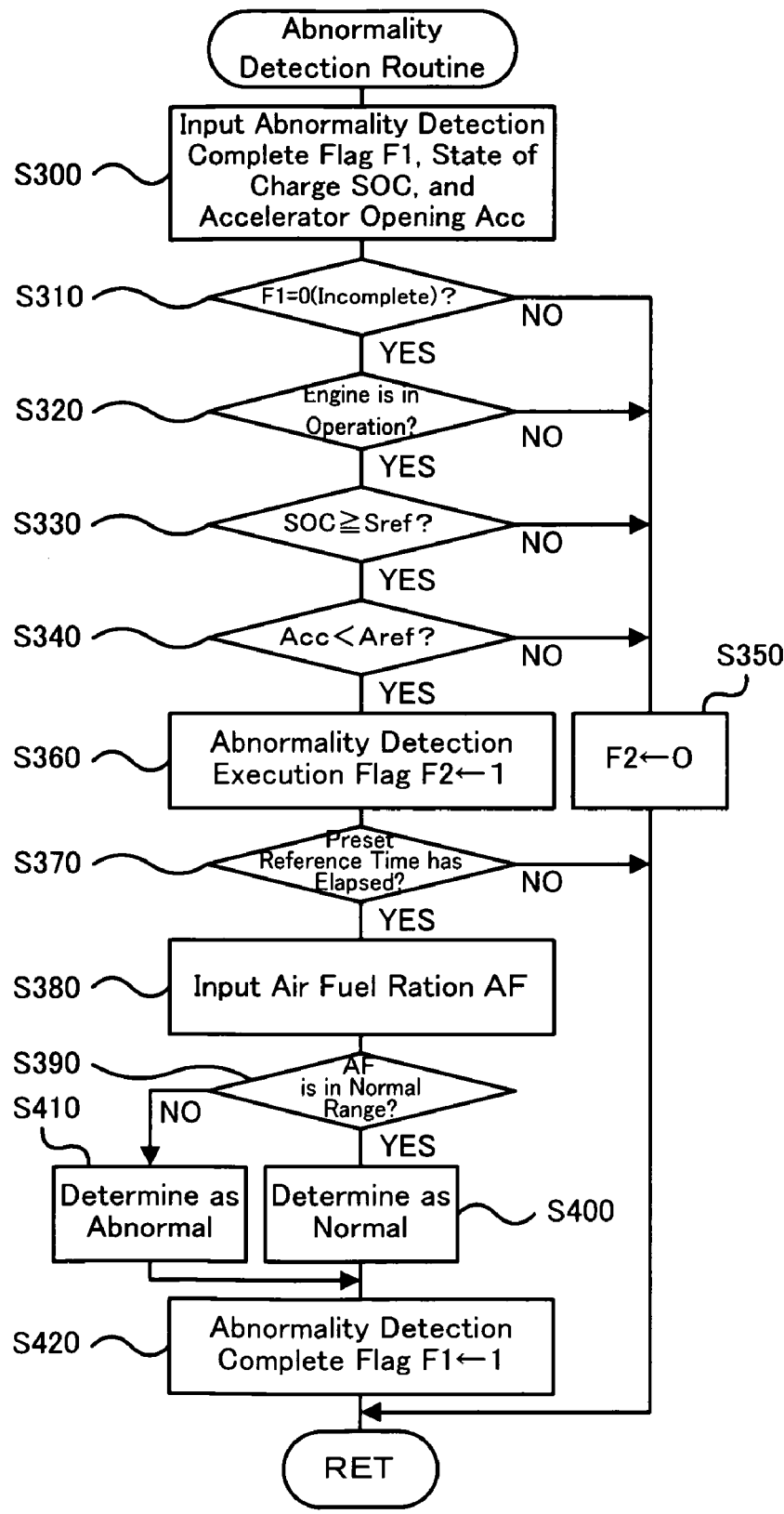
FIG. 9 is a flowchart showing an abnormality detection routine executed by an engine ECU 24 included in the hybrid vehicle 20 of the embodiment.

The following description regards the abnormality detection for detecting an abnormality of the air-fuel ratio sensor 135a. FIG. 9 is a flowchart showing an abnormality detection routine executed by the engine ECU 24. This abnormality detection routine is performed repeatedly at preset time intervals, for example, at every several ten msec.

On the start of the abnormality detection routine, the CPU 24a of the engine ECU 24 first inputs various data required for abnormality detection, for example, the setting of an abnormality detection complete flag F1, the state of charge SOC of the battery 50, and the accelerator opening Acc (step S300). The abnormality detection complete flag F1 is reset to 0 at a system activation of the hybrid vehicle 20, while being set to 1 at step S420 (explained later) upon completion of the abnormality detection of the air-fuel ratio sensor 135a. The state of charge SOC of the battery 50 is computed from the charge-discharge electric current of the battery 50 by the battery ECU 52 and is received from the battery ECU 52 via the hybrid electronic control unit 70. The accelerator opening Acc is detected by the accelerator pedal position sensor 84 and is received from the hybrid electronic control unit 70 by communication.

After the data input, the CPU 24a identifies the value of the abnormality detection complete flag F1 to determine whether the abnormality detection is still incomplete or is completed (step S310). The CPU 24a then sequentially determines whether the engine 22 is in operation (step S320), whether the state of charge SOC of the battery 50 is not lower than a preset reference charge level Sref (step S330), and whether the accelerator opening Acc is less than a preset reference opening Aref (step S340). In response to a negative answer at any of steps S310, S320, S330, and S340, the CPU 24a determines no execution of abnormality detection and resets the abnormality detection execution flag F2 to 0 (step S350) before exiting from this abnormality detection routine. When the abnormality detection complete flag F1 is equal to 1, the abnormality detection has just been performed and there is no requirement for performing the abnormality detection again. When the engine 22 is not in operation but is at stop, it is impossible to perform the abnormality detection. When the state of charge SOC of the battery 50 is lower than the preset reference charge level Sref, the battery 50 does not have any marginal charge. Execution of the abnormality detection leads to failed output of the torque demand Tr* to the ring gear shaft 32a or the driveshaft. When the accelerator opening Acc is not less than the preset reference opening Aref, there is a high level of the torque demand Tr*. Execution of the abnormality detection leads to failed output of the torque demand Tr* to the ring gear shaft 32a or the driveshaft. The reference charge level Sref is determined based on the performance of the battery 50 and is set equal to, for example, 55%, 60%, or 65%. The reference opening Aref is determined based on the performance of the motor MG2 and is set equal to, for example, 20%, 30%, or 40%.

Under the conditions that the abnormality detection complete flag F1 is equal to 0, that the engine 22 is in operation, that the state of charge SOC of the battery 50 is not lower than the preset reference charge level Sref, and that the accelerator opening Acc is less than the preset reference opening Aref (all steps S310, S320, S330, S340: yes), on the other hand, there is a requirement for performing the abnormality detection. The CPU 24a accordingly sets the abnormality detection execution flag F2 to 1 (step S360) and waits until elapse of a preset reference time Tref (step S370). In response to this setting of the abnormality detection execution flag F2 to 1, the drive control routine of FIG. 5 identifies the value of the abnormality detection execution flag F2 as 1 at step S130. The drive control routine of FIG. 5 then cuts off the fuel supply to the engine 22 (step S230), controls the motor MG1 to motor the crankshaft 26 of the engine 22 (step S240), and controls the motor MG2 to output the torque demand Tr* to the ring gear shaft 32a or the driveshaft (steps S170 to S200). The reference time Tref represents a time period required for ensuring stable detection of the air fuel ratio AF by the air-fuel ratio sensor 135a in the atmosphere, which is introduced into the exhaust pipe of the engine 22 by cutoff of the fuel supply to the engine 22 and motoring of the engine 22 by the motor MG1. The reference time Tref is set, for example, to 1 second or 2 seconds.

Figure 10:
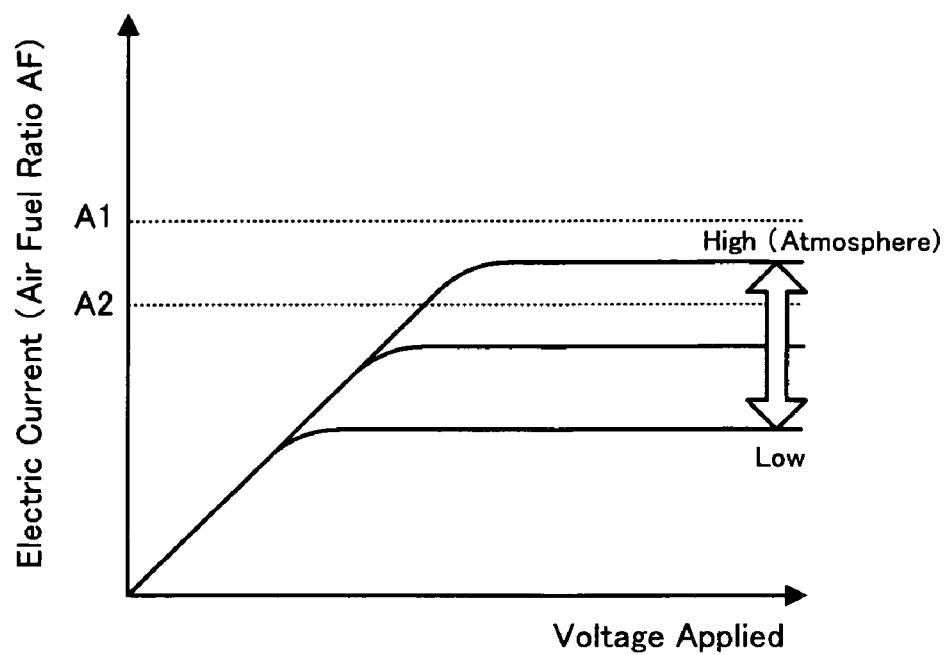

After elapse of the preset reference time Tref, the CPU 24a inputs the air fuel ratio AF from the air-fuel ratio sensor 135a (step S380) and determines whether the input air fuel ratio AF is in a normal range (step S390). When the input air fuel ratio AF is in the normal range, the air-fuel ratio sensor 135a is determined as normal (step S400). When the input air fuel ratio AF is out of the normal range, on the contrary, the air-fuel ratio sensor 135a is determined as abnormality (step S410). After such abnormality detection, the CPU 24a sets the abnormality detection complete flag F1 to 1 (step S420) and exits from this abnormality detection routine. FIG. 10 shows variations in oxygen content against the electric current from the air-fuel ratio sensor 135a representing the air fuel ratio AF and against the voltage applied between the electrodes of the air-fuel ratio sensor 135a. In the graph of FIG. 10, 'A1' and 'A2' respectively denote an upper limit value and a lower limit value defining a general range of the electric current from the air-fuel ratio sensor 135a in the atmosphere. In the state of introducing the atmosphere into the exhaust pipe of the engine 22 by cutoff of the fuel supply to the engine 22 and motoring of the engine 22 by the motor MG1, it is determined whether the air fuel ratio AF input from the air-fuel ratio sensor 135a is in the general range defined by the upper limit value A1 and the lower limit value A2. The result of this determination identifies abnormality (deterioration) or normality of the air-fuel ratio sensor 135a.

When the state of charge SOC of the battery 50 decreases below the preset reference charge level Sref at step S330 or when the accelerator opening Acc increases to or over the preset reference opening Aref at step S340 during execution of the abnormality detection of the air fuel ratio sensor 135a, the abnormality detection execution flag F2 is reset to 0 at step S350. The drive control routine of FIG. 5 gives preference to the output of the power demand Pe* from the engine 22 over the abnormality detection. The abnormality detection is thus interrupted.

Upon identification of the power demand Pe* of less than the preset reference value Pstop in the operation state of the engine 22 at step S140 in the drive control routine of FIG. 5, the hybrid vehicle 20 of the embodiment immediately stops the operation of the engine 22 (step S210) even during its drive. Such drive control significantly lowers the potential for the continued rotation of the engine 22 in the fuel cutoff state and accordingly decreases the opportunity of the abnormality detection, compared with the conventional automobile configured to cut off the fuel supply and apply the engine brake onto the axle in response to the driver's accelerator off operation. When the state of charge SOC of the battery 50 is lower than the preset reference charge level Sref (step S330: no) or when the accelerator opening Acc is not less than the preset reference opening Aref (step S340: no) in the abnormality detection routine of FIG. 9, the hybrid vehicle 20 of the embodiment determines no execution of the abnormality detection, while ensuring output the torque demand Tr* to the ring gear shaft 32a or the driveshaft according to the drive control routine of FIG. 5. When the state of charge SOC of the battery 50 is not lower than the preset reference charge level Sref (step S330: yes) and when the accelerator opening Acc is less than the preset reference opening Aref (step S340: yes) in the abnormality detection routine of FIG. 9, the hybrid vehicle 20 of the embodiment determines execution of the abnormality detection, while cutting off the fuel supply to the engine 22, controlling the motor MG1 to enable motoring of the engine 22, and controlling the motor MG2 to output the torque demand Tr* to the ring gear shaft 32a. This procedure desirably increases the opportunity of the abnormality detection, while ensuring output of the torque demand Tr* to the ring gear shaft 32a or the driveshaft.

As described above, upon incompletion of the abnormality detection in the operation state of the engine 22, when the state of charge SOC of the battery 50 is lower than the preset reference charge level Sref, the hybrid vehicle 20 of the embodiment determines no execution of the abnormality detection, while controlling the operations of the engine 22 and the motors MG1 and MG2 to ensure output of the torque demand Tr* to the ring gear shaft 32a or the driveshaft. Here the abnormality detection process identifies abnormality or normality of the air-fuel ratio sensor 135a, based on the air fuel ratio AF input from the air-fuel ratio sensor 135a. When the state of charge SOC of the battery 50 is not lower than the preset reference charge level Sref, on the other hand, the hybrid vehicle 20 of the embodiment determines execution of the abnormality detection, while controlling the operations of the engine 22 and the motors MG1 and MG2 to ensure output of the torque demand Tr* to the ring gear shaft 32a or the driveshaft with cutting off the fuel supply to the engine 22 and motoring the engine 22 by means of the motor MG1. This arrangement desirably increases the opportunity of the abnormality detection, while ensuring output of the torque demand Tr* to the ring gear shaft 32a or the driveshaft. Namely the abnormality of the air-fuel ratio sensor 135a is detectable at the earlier timing, while the torque demand Tr* is output to the ring gear shaft 32a. When the accelerator opening Acc is not less than the preset reference opening Aref even in the state of charge SOC of the battery 50 of not lower than the preset reference charge level Sref, the preference is given to the output of the power demand Pe* from the engine 22 over the abnormality detection. This arrangement ensures satisfaction of the torque demand Tr* with the higher accuracy.

The hybrid vehicle 20 of the embodiment performs the abnormality detection to identify abnormality or normality of the air-fuel ratio sensor 135a at the frequency of once per every system activation. This is, however, not essential, but the abnormality detection of identifying abnormality or normality of the air-fuel ratio sensor 135a may be performed at any desired timings and at any desired frequency.

In the hybrid vehicle 20 of the embodiment, execution or non-execution of the abnormality detection of the air-fuel ratio sensor 135a is determined, based on the accelerator opening Acc at step S340 in the abnormality detection routine of FIG. 9. One modification may determine execution or non-execution of the abnormality detection, based on the torque demand Tr* instead of the accelerator opening Acc.

The embodiment regards abnormality detection of the air-fuel ratio sensor 135a in the hybrid vehicle 20. The abnormality detection procedure of the embodiment may be modified to identify abnormality or normality of the oxygen sensor 135b. One modified flow of the abnormality detection procedure measures a reaction time from cutoff of the fuel supply in the rotation state of the crankshaft 26 of the engine 22 to a change of the detection result of the oxygen sensor 135b to the lean condition and identifies abnormality or normality of the oxygen sensor 135b based on the measured reaction time.

Figure 11:
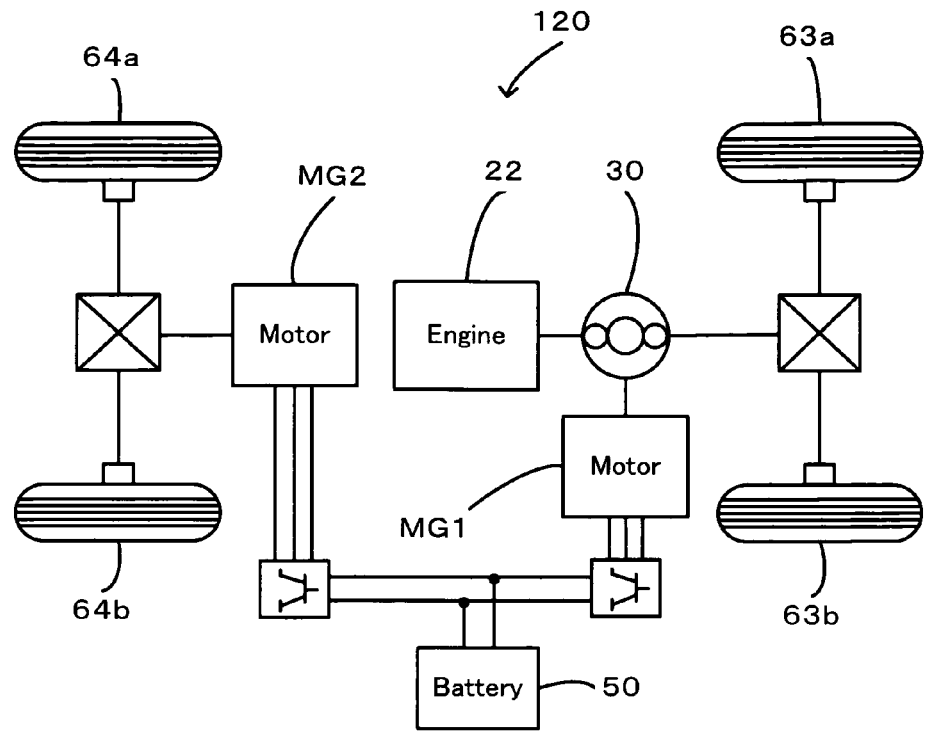
FIG. 11 schematically illustrates the configuration of another hybrid vehicle 120 in one modified example.

In the hybrid vehicle 20 of the embodiment, the power of the motor MG2 is converted by the reduction gear 35 and is output to the ring gear shaft 32a. The technique of the invention is also applicable to a hybrid vehicle 120 of a modified structure shown in FIG. 11. In the hybrid vehicle 120 of FIG. 11, the power of the motor MG2 is connected to another axle (an axle linked with wheels 64a and 64b) that is different from the axle connecting with the ring gear shaft 32a (the axle linked with the drive wheels 63a and 63b).

Figure 12:
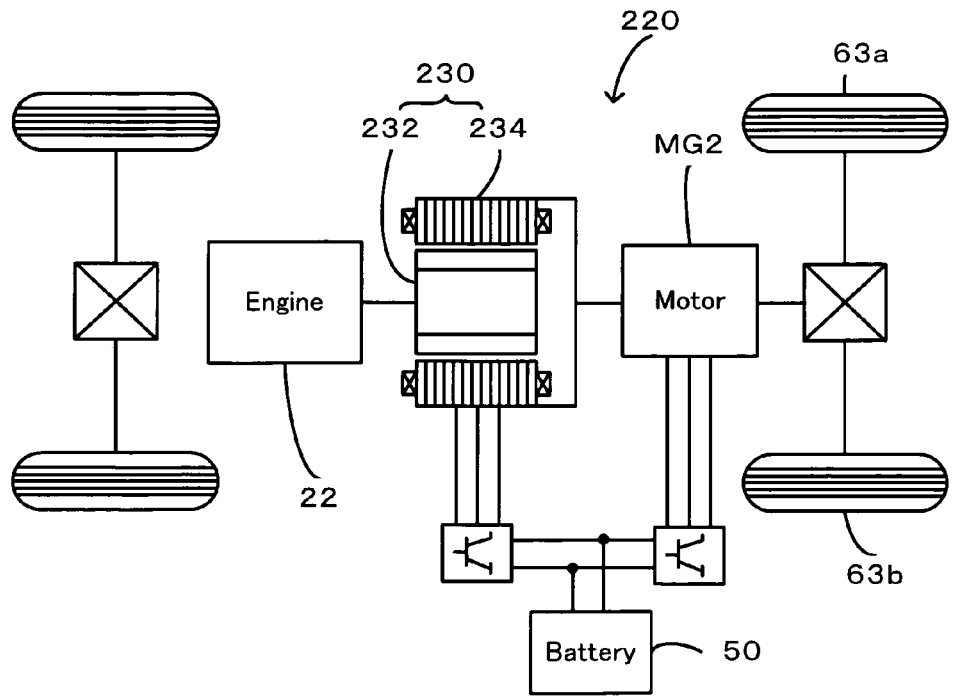
FIG. 12 schematically illustrates the configuration of still another hybrid vehicle 220 in another modified example.

In the hybrid vehicle 20 of the embodiment, the power of the engine 22 is transmitted via the power distribution integration mechanism 30 to the ring gear shaft 32a or the driveshaft linked with the drive wheels 63a and 63b. The technique of the invention is also applicable to a hybrid vehicle 220 of another modified structure shown in FIG. 12. The hybrid vehicle 220 of FIG. 12 is equipped with a pair-rotor motor 230. The pair-rotor motor 230 includes an inner rotor 232 connected to the crankshaft 26 of the engine 22 and an outer rotor 234 connected to a driveshaft for outputting power to the drive wheels 63a and 63b. The pair-rotor motor 230 transmits part of the output power of the engine 22 to the driveshaft, while converting the residual engine output power into electric power.

The embodiment and its modified examples regard application of the invention to the hybrid vehicles of various configurations. The principle of the invention is, however, not restricted to the power output apparatuses mounted on such hybrid vehicles but is also applicable to power output apparatuses mounted on diversity of moving bodies including various automobiles and other vehicles, boats and ships, and air craft, as well as power output apparatuses built in stationary equipment including construction machinery. Another application of the invention is a control method of such a power output apparatus.

The primary elements in the embodiment and its modified examples are mapped to the primary constituents in the claims of the invention as described below. The engine 22 of the embodiment corresponds to the 'internal combustion engine' of the invention. The combination of the power distribution integration mechanism 30 with the motor MG1 is equivalent to the 'electric power-mechanical power input output assembly' of the invention. The motor MG2, the battery 50, and the air-fuel ratio sensor 135a respectively correspond to the 'motor', the 'accumulator', and the 'oxygen content detector' of the invention. The battery ECU 52 of computing the state of charge SOC of the battery 50 from the integrated value of the charge-discharge current is equivalent to the 'charge level computation module' of the invention. The hybrid electronic control unit 70 of executing the processing of step S110 in the drive control routine of FIG. 5 to set the torque demand Tr* corresponding to the accelerator opening Acc and the vehicle speed V is equivalent to the 'driving force demand setting module' of the invention. The combination of the hybrid electronic control unit 70 of executing the drive control routine of FIG. 5 with the engine ECU of executing the abnormality detection routine of FIG. 9 and controlling the operation of the engine 22 and the motor ECU 40 of controlling the operations of the motors MG1 and MG2 based on the torque commands Tm1* and Tm2* is equivalent to the 'controller' of the invention. Upon incompletion of the abnormality detection of the air-fuel ratio sensor 135a in the operation state of the engine 22, when the state of charge SOC of the battery 50 is lower than the preset reference charge level Sref, the engine ECU 24 determines no execution of the abnormality detection according to the abnormality detection routine of FIG. 9. The hybrid electronic control unit 70 then sets the target rotation speed Ne* and the target torque Te* of the engine 22 and the torque commands Tm1* and Tm2* of the motors MG1 and MG2 to ensure output of the torque demand Tr* to the ring gear shaft 32a or the driveshaft according to the drive control routine of FIG. 5. When the state of charge SOC of the battery 50 is not lower than the preset reference charge level Sref, the engine ECU 24 determines execution of the abnormality detection according to the abnormality detection routine of FIG. 9. The hybrid electronic control unit 70 then sends the fuel cutoff instruction to the engine ECU 24 to cut off the fuel supply to the engine 22, while sending the torque commands Tm1* and Tm2* to the motor ECU 40 to enable motoring of the engine 22 by means of the motor MG1 and ensure output of the torque demand Tr* from the motor MG2 to the ring gear shaft 32a or the driveshaft. The motor MG1 and the power distribution integration mechanism 30 of the embodiment respectively correspond to the 'generator' and the 'three shaft-type power input output structure' of the invention. The pair-rotor motor 230 in the modified example also corresponds to the 'electric power-mechanical power input output assembly' of the invention. The 'internal combustion engine' is not restricted to the engine 22 designed to consume a hydrocarbon fuel, such as gasoline or light oil, and thereby output power, but may be an internal combustion engine of any other design, for example, a hydrogen engine. The 'electric power-mechanical power input output assembly' is not restricted to the combination of the power distribution integration mechanism 30 with the motor MG1 or to the pair-rotor motor 230 but may be any structure connected to a driveshaft linked with an axle of the vehicle and to an output shaft of the internal combustion engine in a rotatable manner independently of the driveshaft and configured to output a torque to the driveshaft and to the output shaft through input and output of electric power and mechanical power. The 'motor' is not restricted to the motor MG2 constructed as a synchronous motor generator but may be any type of motor designed to input and output power from and to the driveshaft, for example, an induction motor. The accumulator' is not restricted to the battery 50 as a secondary battery but may be a capacitor or any other storage unit arranged to transmit electric power to and from the electric power-mechanical power input output assembly and the motor. The 'oxygen content detector' is not restricted to the air-fuel ratio sensor 135a but may be the oxygen sensor 135b or any other sensor located in an exhaust system of the internal combustion engine and designed to measure the concentration of oxygen included in the exhaust gas of the internal combustion engine. The 'charge level computation module' is not restricted to the arrangement of computing the state of charge SOC of the battery 50 from the integrated value of the charge-discharge current but may be any other arrangement of computing a charge level of the accumulator. The 'driving force demand setting module' is not restricted to the arrangement of setting the torque demand Tr* corresponding to the accelerator opening Acc and the vehicle speed V but may be any other arrangement of setting a driving force demand required for driving, for example, an arrangement of setting a torque demand corresponding to only the accelerator opening Acc or an arrangement of setting a torque demand based on a location of the vehicle on a preset drive route. The 'controller' is not restricted to the combination of the hybrid electronic control unit 70 with the engine ECU 24 and the motor ECU 40 but may be actualized by a single electronic control unit. The 'controller' is not restricted to the arrangement of, upon incompletion of the abnormality detection of the air-fuel ratio sensor 135a based on the air fuel ratio AF measured by the air-fuel ratio sensor 135a during operation of the engine 22, in the state of charge SOC of the battery 50 of lower than the preset reference charge level Sref, determining no execution of the abnormality detection while controlling the operations of the engine 22 and the motors MG1 and MG2 to ensure output of the torque demand Tr* to the ring gear shaft 32a or the driveshaft, and in the state of charge SOC of the battery 50 of not lower than the preset reference charge level Sref, determining execution of the abnormality detection while controlling the operations of the engine 22 and the motors MG1 and MG2 to cut off the fuel supply to the engine 22, enable motoring of the engine 22 by means of the motor MG1, and ensure output of the torque demand Tr* from the motor MG2 to the ring gear shaft 32a. The 'controller' may be any other arrangement of, in response to an abnormality detection request for executing abnormality detection to identify abnormality or normality of the oxygen content detector during operation of the internal combustion engine, when the computed charge level of the accumulator is less than a preset reference charge level, determining non-execution of the abnormality detection of the oxygen content detector regardless of the abnormality detection request while controlling the internal combustion engine, the electric power-mechanical power input output assembly, and the motor to ensure output of a driving force corresponding to the set driving force demand to the driveshaft, and when the computed charge level of the accumulator is not less than the preset reference charge level, cutting off a fuel supply to the internal combustion engine and executing the abnormality detection to identify abnormality or normality of the oxygen content detector based on an output of the oxygen content detector while controlling the internal combustion engine, the electric power-mechanical power input output assembly, and the motor to ensure output of a driving force corresponding to the set driving force demand to the driveshaft. The 'generator' is not restricted to the motor MG1 constructed as a synchronous motor generator but may be any type of generator designed to input and output power, for example, an induction motor generator. The 'three shaft-type power input output structure' is not restricted to the power distribution integration mechanism 30 but may be any structure connected to three shafts, the driveshaft, the output shaft of the internal combustion engine, and a rotating shaft of the generator, and designed to input and output power to a residual shaft based on powers input from and output to any two shafts among the three shafts, for example, a structure adopting a double pinion-type planetary gear mechanism, a structure connected to four or a greater number of shafts by combination of multiple planetary gear mechanisms, or a structure adopting a differential gear or another differential motion mechanism other than the planetary gear mechanism. The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

The disclosure of Japanese Patent Application No. 2007-124665 filed on May 9, 2007 including specification, drawings and claims is incorporated herein by reference in its entirety.

What is claimed is:

1. A power output apparatus constructed to output power to a driveshaft, the power output apparatus comprising:
an internal combustion engine;
an electric power-mechanical power input output assembly connected with the driveshaft and with an output shaft of the internal combustion engine in a rotatable manner independently of the driveshaft and configured to output a torque to the driveshaft and to the output shaft through input and output of electric power and mechanical power;
a motor designed to input and output power from and to the driveshaft;
an accumulator arranged to transmit electric power to and from the electric power-mechanical power input output assembly and the motor;
an oxygen content detector located in an exhaust system of the internal combustion engine and designed to measure a concentration of oxygen included in an exhaust gas of the internal combustion engine;
a charge level computation module configured to compute a charge level of the accumulator;
a driving force demand setting module configured to set a driving force demand required for the driveshaft; and
a controller configured to respond to an abnormality detection request for executing abnormality detection to identify abnormality or normality of the oxygen content detector during operation of the internal combustion engine, wherein when the computed charge level of the accumulator is lower than a preset reference charge level, said controller determines non-execution of the abnormality detection of the oxygen content detector regardless of the abnormality detection request, while controlling the internal combustion engine, the electric power-mechanical power input output assembly, and the motor to ensure output of a driving force corresponding to the set driving force demand to the driveshaft, and wherein when the computed charge level of the accumulator is not lower than the preset reference charge level, said controller determines to cut off a fuel supply to the internal combustion engine and execute the abnormality detection of identifying abnormality or normality of the oxygen content detector based on an output of the oxygen content detector, while controlling the internal combustion engine, the electric power-mechanical power input output assembly, and the motor to ensure output of a driving force corresponding to the set driving force demand to the driveshaft.

2. The power output apparatus in accordance with claim 1, wherein even if the computed charge level of the accumulator is not lower than the preset reference charge level, when the set driving force demand is not less than a preset reference driving force, the controller determines non-execution of the abnormality detection of the oxygen content detector while controlling the internal combustion engine, the electric power-mechanical power input output assembly, and the motor to ensure output of the driving force corresponding to the set driving force demand to the driveshaft.

3. The power output apparatus in accordance with claim 1, wherein the electric power-mechanical power input output assembly has:

a generator designed to input and output power; and a three shaft-type power input output structure connected to three shafts, the driveshaft, the output shaft of the internal combustion engine, and a rotating shaft of the generator, and designed to input and output power to a residual shaft based on powers input from and output to any two shafts among the three shafts.

4. A vehicle, comprising:
an internal combustion engine;
an electric power-mechanical power input output assembly connected to a driveshaft linked with an axle of the vehicle and to an output shaft of the internal combustion engine in a rotatable manner independently of the driveshaft and configured to output a torque to the driveshaft and to the output shaft through input and output of electric power and mechanical power;

a motor designed to input and output power from and to the driveshaft;

an accumulator arranged to transmit electric power to and from the electric power-mechanical power input output assembly and the motor;

an oxygen content detector located in an exhaust system of the internal combustion engine and designed to measure a concentration of oxygen included in an exhaust gas of the internal combustion engine;

a charge level computation module configured to compute a charge level of the accumulator;

a driving force demand setting module configured to set a driving force demand required for the driveshaft; and a controller configured to respond to an abnormality detection request for executing abnormality detection to identify abnormality or normality of the oxygen content detector during operation of the internal combustion engine, wherein when the computed charge level of the accumulator is lower than a preset reference charge level, said controller determines non-execution of the abnormality detection of the oxygen content detector regardless of the abnormality detection request, while controlling the internal combustion engine, the electric power-mechanical power input output assembly, and the motor to ensure output of a driving force corresponding to the set driving force demand to the driveshaft, and wherein when the computed charge level of the accumulator is not lower than the preset reference charge level, said controller determines to cut off a fuel supply to the internal combustion engine and execute the abnormality detection of identifying abnormality or normality of the oxygen content detector based on an output of the oxygen content detector, while controlling the internal combustion engine, the electric power-mechanical power input output assembly, and the motor to ensure output of a driving force corresponding to the set driving force demand to the driveshaft.

* * * * *

UNITED STATES PATENT AND TRADEMARK OFFICE
CERTIFICATE OF CORRECTION

PATENT NO. : 7,641,009 B2  Page 1 of 1
APPLICATION NO. : 12/149513
DATED : January 5, 2010
INVENTOR(S) : Hikokazu Akimoto It is certified that error appears in the above-identified patent and that said Letters Patent is hereby corrected as shown below:

| Column | Line | |
|---|---|---|
| 11 | 35 | Change "gear ratio p" to --gear ratio $\rho$--. |
| 12 | 5 | Change "gear ratio p" to --gear ratio $\rho$--. |

Signed and Sealed this

Twenty-third Day of March, 2010

David J. Kappos
*Director of the United States Patent and Trademark Office*